March 6, 1928.  1,661,275
I. N. STENSLAND
ANCHOR HOIST
Filed March 5, 1926
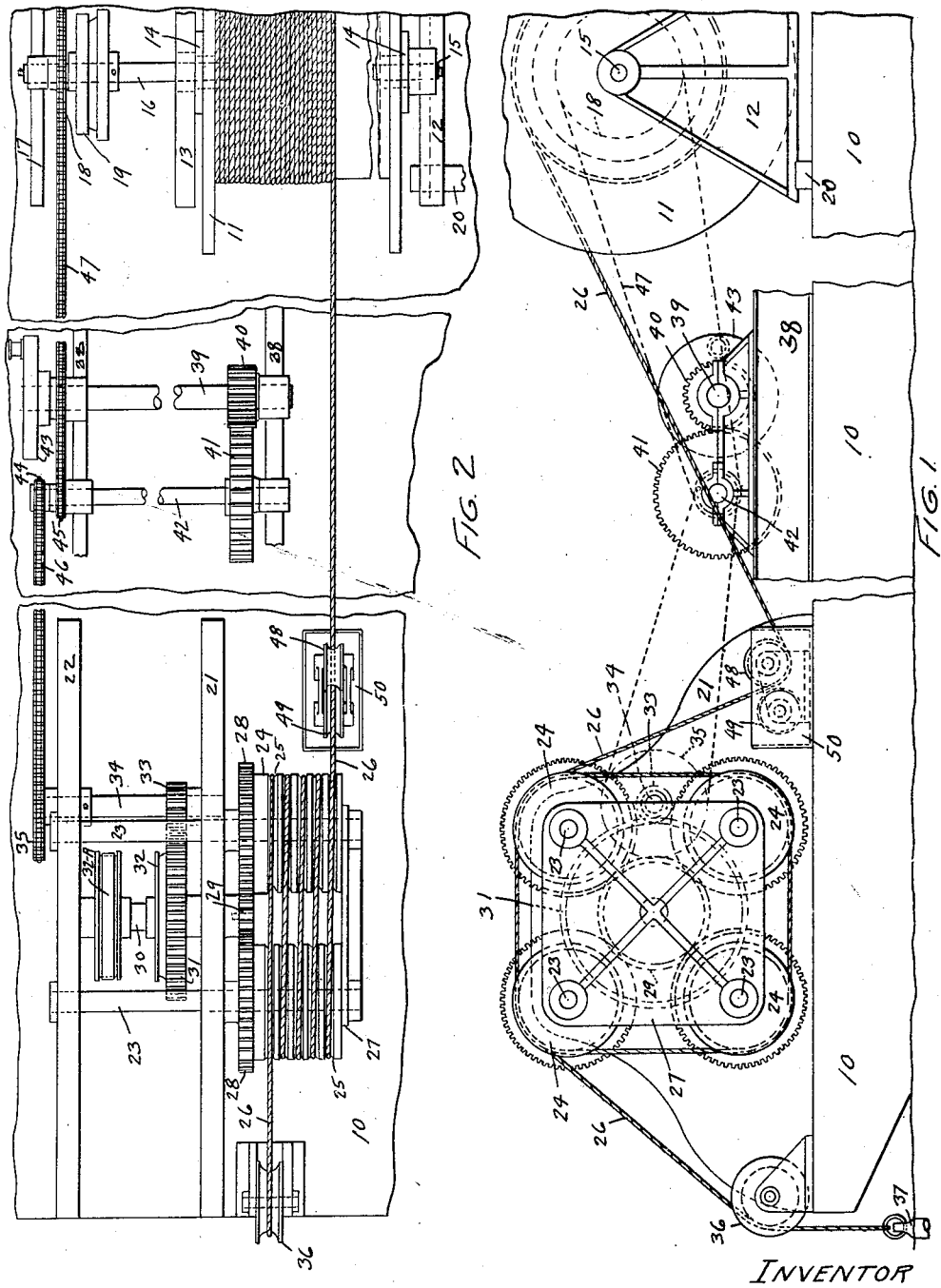
INVENTOR
I. N. STENSLAND
By C. B. Birkenbeul.
HIS ATTORNEY Patented Mar. 6, 1928.

1,661,275

UNITED STATES PATENT OFFICE.

IVER N. STENSLAND, OF KETCHIKAN, TERRITORY OF ALASKA.

ANCHOR HOIST.

Application filed March 5, 1926. Serial No. 92,651.

This invention relates generally to the fishing industry, and particularly to the handling of anchors such as are used with floating traps in the salmon fishing industry and in places where unusual lengths of wire cable must be handled.

The first object of this invention is to provide an exceedingly simple and efficient cable-handling hoist whereby fishing trap anchors may be lowered or hauled in with a minimum amount of labor and the expenditure of only a fraction of the time ordinarily required in such operations.

The second object is to enable the trap builder to take cable directly from its spool and after attaching it to the anchor pay it out as fast and as far as desired without danger of kinking the line, or the necessity of frequent cutting of the line with the forced insertion of shackles, which operations are caused whenever the line is first wound on the drum of a donkey engine and then coiled on the deck of a scow without the lowering of the anchor, in which event each coil as it goes overboard causes a twist to be put into the line. These twists ultimately cause kinks in the line which break under the severe stresses to which such lines are subjected.

The third object is to enable the fisherman to place his traps in the most advantageous position, which is in rough water where the current is swift and water deep, which conditions are especially favorable to trap fishing for salmon.

The fourth object is to enable the fisherman to place his traps on the best location regardless of the kind of bottom or depth of water.

The fifth object is to render possible the use of cheap concrete anchors, the use of which has been abandoned owing to the large amount of breakage caused by the anchors striking the bottom, which breakage is eliminated by my device, due to the fact that the anchor can be lowered to the bottom of the fishing ground as gently as desired.

These, and other objects, will become more apparent from the specification following as illustrated in the accompanying drawing, in which:

Figure 1 is a side elevation of the apparatus with a portion broken away in order that it might be shown at a relatively large scale.

Figure 2 is a plan of Figure 1 showing portions of the scow deck and such elements of the device as are required to explain its operation.

Similar numbers of reference refer to the same parts throughout the views.

In order to better explain the device and the reasons for its construction, it is first stated that its field of use lies over such trap fishing grounds whose bottoms are so deep or rocky as to render the driving of piling impractical.

Referring in detail to the drawing, the device itself is ordinarily mounted on a scow 10 and consists of three elements, namely the spooling apparatus, the hoist itself and the prime mover, which ordinarily consists of a two drum donkey engine with two power take-offs.

The derrick for lifting the anchor out of the water and for handling the spools of cable is not illustrated as its use is well understood. It is operated by the drums of the donkey engine, one drum being employed for raising and lowering the load on the derrick and the other drum being used for slewing the derrick boom.

Spooling apparatus.

This consists of the ordinary wooden spool 11 on which wire rope is ordinarily sold and which is mounted between the removable standard 12 and the fixed standard 13. The spool 11 is provided at each end with a metal bushing 14, one of which receives the dead shaft 15 in the standard 12 and the other can be secured to a live shaft 16 which journals across the standards 13 and 17. The shaft 16 is driven by the sprocket 18 through the clutch 19, which clutch accommodates the winding action of the spool 11 to the speed of the hoist, and also acts as a brake for the spool when paying out the line and when casting the anchor.

The frame 12 is preferably mounted on the tracks 20 to facilitate the removal of the spool with the aid of a power sling on the track.

Hoist.

The hoist itself includes the side frames 21 and 22 across which are mounted four stationary shafts 23 on whose projecting ends are suitably journaled the grooved drums 24 whose grooves 25 are adapted to handle the anchor line 26. A tie plate 27 is placed across the ends of the shafts 23 to support the shaft ends. Each drum 24 has secured thereto a gear 28, and midway between the four gears 28 and meshing with all of same, is a pinion 29 on the shaft 30, to which motion is supplied by the gear 31 through the clutch 32. A band brake 32$^A$ is also provided on the shaft 30 to facilitate the handling of the drums.

A pinion 33 on the shaft 34 meshes with the gear 31. On the shaft 34 is secured a sprocket wheel 35. A sheave 36 is mounted on the end of the scow deck and holds the line away from the scow. The anchor 37 is attached to the line 26 in the usual manner.

Prime mover.

Power is supplied to the device from a donkey engine which is shown only in part and across whose side frames 38 is mounted the crank shaft 39 whose pinion 40 drives the gear 41 on the shaft 42, which also journals across the frames 38.

A crank 43 is shown in place on the shaft 39. On the shaft 42 are secured the sprocket pinions 44 and 45, the former of which drives the sprocket wheel 35 through the chain 46 and the latter of which drives the sprocket wheel 18 through the chain 47.

Such details as the donkey boiler, engine cylinders and frame, brake levers and clutch operating mechanism are purposely omitted in order to simplify the drawing. It is to be understood that the entire drawing is somewhat diagrammatic and is intended to illustrate only the principles rather than the exact details of construction as are employed when actually building the device. Moreover, the employment of clutches and brakes above described is optional, as is their exact location, whether it is close to the element being controlled or whether it forms a part of the prime mover is of little importance and does not enter into the invention.

In order to make the rope lead on to the drums from the spools a pair of fair-leading sheaves 48 and 49 are provided on the scow. These are placed in an oil tank 50 in which crude oil may be placed whenever it is desired to run the cable on to the spool for storage purposes; crude oil, of course, tending to prevent deterioration of the line. When paying the line out no oil is kept in the tank 50, as it would not be necessary to oil the line before putting it into the water.

The operation of the device is as follows: Assume that a trap is to be set in one thousand feet of water, which is common practice, and the anchor lines to be employed must be not less than three or four thousand feet in length preferably of one and one-half inch plow steel cable to which is attached the diamond fluke anchor weighing in the neighborhood of twelve tons. It is evident that the problem of lowering the anchor without wrecking same on a rocky bottom is no slight one.

With my device a spoolful of line is placed between the frames 12 and 13 and the end of the cable is wound around the four drums 24, one turn of the cable occupying one set of grooves 25. The anchor 37 is now attached to the end of the line and lowered over the side of the scow with the line running over the sheave 36.

To pay out the line the operator slips the clutch 32, and if it seems necessary adds to the retarding action by applying the brake 32$^A$. This retarding action can be secured wholly or in part through the engine itself, as is well understood.

The friction drive for the spool 11 must enable the spool to pay out the line as rapidly as it is being handled by the drums, or to take it in as rapidly as its hauled in by the drums, only a slight amount of tension being carried on the line between the spool and the drums. The slippage on the spool-driving clutch will take care of the changing diameter of the spool. In some cases it may be desired to omit the spooling apparatus altogether, as when handling soft lines or when the line is to be coiled by hand. Although, of course, the greatest advantage lies in the employment of a spool which eliminates all kinks from the line.

It must be borne in mind that floating fish traps require from three to seven anchors each. These must be cast whenever the trap is set at the start of the fishing season and hauled in at the close of the season when the trap is anchored in smoother water, in order to prevent same from being unnecessarily injured between fishing seasons.

During operations, the nets themselves are pulled to and fro with tide and current with increasing force as kelp and seaweed accumulate on them, and the pull on the anchor lines is enormous. Owing to the present difficulty of handling the lines, under size lines are often employed and their numbers increased to provide the proper amount of anchorage.

With my device instead of first running the line from the spool onto a donkey drum whose capacity is normally around five hundred feet, and then cutting the line and coiling it off of the donkey drum onto the scow deck, and repeating this operation with more line from the spool and subsequently joining the various lengths by means of shackles, after which the various coils are carried into the water by the weight of the anchor being cast, I prefer not to cut the line at all but to pay it out directly from the spool on which it is stored without the introduction of shackles, which tend to weaken the line and interfere with its subsequent winding on the drums or storage spools.

I claim:

1. An anchor hoist having, in combination, a scow; a winding device mounted on one end of said scow comprising four gear-driven grooved drums having one intermediate drive gear for driving all of said drums in the same direction at the same speed; a cable storage spool rotatably mounted on the opposite end of said scow; an engine for driving said spool and winding device; friction drives between said engine and storage and winding drums; and brake means on said winding drum.

2. An anchor hoist having, in combination, a scow; a winding device mounted on one end of said scow comprising four gear-driven grooved drums having one intermediate drive gear for driving all of said drums in the same direction at the same speed; a cable storage spool rotatably mounted on the opposite end of said scow; an engine for driving said spool and winding device; friction drives between said engine and storage and winding drums; brake means on said winding drum; and fair-leading sheaves between said storage and winding drums having an oil reservoir formed around same through which the cable is made to pass while being spooled on said storage drum.

IVER N. STENSLAND.